United States Patent

Demiryont et al.

Patent Number: 5,234,748
Date of Patent: Aug. 10, 1993

[54] ANTI-REFLECTIVE TRANSPARENT COATING WITH GRADIENT ZONE

[75] Inventors: Hulya Demiryont, Farmington Hills; Roman Surowiec, Redford, both of Mich.

[73] Assignee: Ford Motor Company, Dearborn, Mich.

[21] Appl. No.: 717,606

[22] Filed: Jun. 19, 1991

[51] Int. Cl.$^5$ .......................................... B32B 17/06
[52] U.S. Cl. ................................. 428/216; 428/212; 428/426; 428/428; 428/446; 428/698; 428/701; 428/702; 428/913
[58] Field of Search ............... 428/446, 428, 698, 216, 428/212, 426, 701, 702, 913; 430/57, 63

[56] References Cited

U.S. PATENT DOCUMENTS

| | | | |
|---|---|---|---|
| 3,990,784 | 11/1976 | Gelber | 350/166 |
| 4,070,097 | 1/1978 | Gelber | 350/165 |
| 4,100,330 | 7/1978 | Donley | 428/429 |
| 4,144,684 | 3/1979 | Kirkbridge et al. | 428/428 |
| 4,185,894 | 1/1980 | Hilton et al. | 350/338 |
| 4,188,444 | 2/1980 | Landau | 428/428 |
| 4,365,013 | 12/1982 | Ishioka et al. | 430/57 |
| 4,485,146 | 11/1984 | Mizuhashi et al. | 428/428 |
| 4,497,539 | 2/1985 | Sakurai et al. | 350/164 |
| 4,546,050 | 10/1985 | Amberger et al. | 428/630 |
| 4,634,684 | 1/1987 | Dumbaugh, Jr. | 501/69 |
| 4,683,186 | 7/1987 | Ohashi et al. | 430/63 |
| 4,689,873 | 9/1987 | Kramer | 437/2 |
| 4,732,801 | 3/1988 | Joshi | 428/698 |
| 4,737,018 | 4/1988 | Iwashita et al. | 350/339 R |
| 4,737,379 | 4/1988 | Hudgens | 427/39 |
| 4,765,729 | 8/1988 | Taniguchi | 351/163 |
| 4,773,964 | 9/1988 | Haond | 156/603 |
| 4,780,334 | 10/1988 | Ackerman | 427/248.1 |
| 4,802,737 | 2/1989 | Denton | 350/166 |
| 4,815,821 | 3/1989 | Nonogaki et al. | 350/164 |
| 4,822,120 | 4/1989 | Fan et al. | 350/1.7 |
| 4,822,748 | 4/1989 | Janesick et al. | 437/3 |
| 4,835,040 | 5/1989 | Callies et al. | 428/215 |
| 4,846,151 | 7/1989 | Simko, Jr. | 126/441 |
| 4,847,157 | 7/1989 | Goodman et al. | 428/426 |

FOREIGN PATENT DOCUMENTS

0345107 12/1989 European Pat. Off.

OTHER PUBLICATIONS

Pawlewicz et al., *Optical Thin Films—Recent Developments In Reactively Sputtered Optical Thin Films*, Proceedings of the SPIE, vol. 325, pp. 105-112 (Jan. 26-27, 1982).

Pawlewicz et al, *Improved Si-Based Coating Materials for High Power Infrared Lasers* (Nov., 1981).

Stone et al., *Reflectance, Transmittance and Loss Spectra of Multilayer $Si/SiO_2$ Thin Film Mirrors and Antireflection Coatings For 1.5 $\mu m$*, Applied Optics, vol. 29, No. 4 (1 Feb. 1990).

Pawlewicz et al., *1315 NM Dielectric Mirror Fabrication By Reactive Sputtering* presented at the Topical Meeting on High Power Laser Optical Components held at Boulder, Colo. in Oct., 1984.

Martin et al., *Optical Coatings for Energy Efficiency and Solar Applications*, Proceedings of the SPIE, vol. 324, pp. 184-190 (Jan. 28-29, 1982).

Primary Examiner—A. A. Turner
Attorney, Agent, or Firm—Lorraine S. Melotik; Roger L. May

[57] ABSTRACT

An anti-reflective coating employing a gradient layer of $Si_{1-x}Q_xO_y$ wherein Q is H, for which x has a value from zero to 0.5, or N, for which x has a value from zero to 0.58, and the value of y varies with depth in the coating, increasing from zero closest the substrate to 2. In certain preferred embodiments the anti-reflective coating is substantially transparent to visible light and yet provides good anti-reflectance. Laminated glazing units having such anti-reflective coatings can be used, for example, in applications requiring high transmittance of visible light, such as motor vehicle windshields.

12 Claims, 3 Drawing Sheets

ANTI-REFLECTIVE TRANSPARENT COATING WITH GRADIENT ZONE

INTRODUCTION

The present invention is directed to an anti-reflective coating which is substantially transparent to visible light. The anti-reflective coating of the invention is particularly suitable for use on glazing units, such as automotive and architectural windows.

BACKGROUND OF THE INVENTION

Anti-reflective coatings have been used in various applications for some time. Exemplary applications include lenses, glazing units, mirrors and the like. It is also advantageous to use anti-reflective coatings on architectural and automotive glazing units in certain applications, especially on the inside and/or outside surfaces of motor vehicle windshields, sunroofs and the like. A suitable anti-reflective coating on the inside surface of a motor vehicle windshield would facilitate the use of lighter colored instrument panel materials. Used with sunroof panels or other glass roof panels an anti-reflective interior coating would reduce undesirable stray reflections from interior and exterior objects. Without an anti-reflective coating, vision through the windshield might be impaired by light from such lighter colored instrument panel reflecting on the inside surface of the windshield. An anti-reflective coating on the outside of a windshield increases transmitted light intensity and helps meet applicable minimum transparency requirements. Presently, minimum transmittance of visible light for motor vehicle windshields is 70% in the United States and 75% in Europe. To be suitable for use in a vehicle windshield or other glazing application, the anti-reflective coating must not reduce the transparency of the glazing unit to an unacceptable degree.

Numerous anti-reflective coatings are known, many of which comprise a film stack in which a first film of relatively high refractive index material is paired with a second film of lower refractive index material. Thus, for example, U.S. Pat. No. 4,846,151 to Simko, Jr. suggests that various surfaces of transparent plates used in solar collectors can be coated with an anti-reflective material. Exemplary materials are listed, including multi-layer coatings such as silicon dioxide paired with aluminum oxide or titanium dioxide. Similarly, U.S. Pat. No. 4,822,748 to Janesick et al suggests the use of an anti-reflective coating on glass used in picture frames and the like. Specifically, it suggests the preparation of a triple layer film stack in which a film of titanium oxide is sandwiched between films of silicon dioxide. Other materials, such as zirconium oxide, tantalum oxide and magnesium oxide also are mentioned. The use of silicon monoxide is suggested as an anti-reflective coating for optical parts made of synthetic resin in U.S. Pat. No. 4,497,539 to Sakurai et al. Silicon monoxide also is suggested, as is silicon dioxide, as an anti-reflective layer having high infrared reflectivity and high visible light transmission suitable for use in heat-mirrors in U.S. Pat. No. 4,822,120 to Fan et al. In U.S. Pat. No. 4,815,821 to Nonogaki et al a light transmitting glass panel is suggested having on its surface a coating consisting of a silicon monoxide layer over a titanium oxide layer. The silicon monoxide layer is said to be intermittently spaced from the titanium dioxide layer by a light absorbing layer of colloidal carbon. A transparent optical article, such as a lens, is suggested in U.S. Pat. No. 4,765,729 to Taniguchi. Silicon dioxide is suggested as a suitable anti-reflective coating for the surface of the article.

The use of an anti-reflective coating on both the inside and the outside of an ophthalmic lens is suggested in U.S. Pat. No. 4,070,097 to Gelber. Each of the two coatings is said to have two layers, a dielectric layer and a metal layer. For the metal layer, suitable materials are said to include nickel, chromium, Inconel and Nichrome (a material comprised essentially of nickel and chromium). The metal layer is said typically to have a thickness ranging from 10 to 40 Angstroms. Various materials, including silicon dioxide, are listed for the dielectric layer. A second U.S. patent to Gelber, U.S. Pat. No. 3,990,784, is directed to coated architectural glass having a multi-layer coating on its surface. The coating is said to comprise first and second metal layers spaced from each other by a dielectric layer disposed between them. An additional metal oxide layer is said to be used optionally for anti-reflective purposes. Nickel is mentioned as being a suitable metal together with silicon dioxide as the dielectric layer.

The optical properties of silicon/silicon dioxide multilayer systems are discussed in Stone et al., *Reflectance, Transmittance and Lost Spectra of Multilayer Si/SO$_2$ Thin Film Mirrors and Antireflection Coatings For 1.5 $\mu m$*, Applied Optics, Vol. 29, No. 4 (1 Feb. 1990). Stone et al suggest that in the spectral region between 1.0 and 1.6 $\mu m$, a useful and easy to handle combination of paired layers is silicon and silica. The paper is directed to the fabrication of multilayer systems. It is noted therein that the greater the difference in the index of refraction of the paired layers, the fewer the number of layers will be needed to obtain a desired level of reflectance. Silicon is noted to have a relatively high index of refraction. The paper states that silicon cannot be used as a material in the film pair for light below about 1.0 $\mu m$ wavelength, for visible light, for example, due to its high absorption of light in that range. Visible light has a wavelength in the range of about 0.4 to 0.75 $\mu m$. Thus, while suggesting that a simple two layer anti-reflection coating can be made using silicon and silicon dioxide, the article clearly teaches that such anti-reflection coating is not suitable for application requiring transparency to visible light. The article notes that Si/SiO$_2$ film pairs for high reflectance mirrors and anti-reflection coatings have been deposited by reactive sputtering. The coatings discussed in the paper are said to have been deposited by electron beam evaporation onto glass substrates. The anti-reflection coatings described in the Stone et al article are said to consist of a layer of silicon about 150 Angstroms thick with a layer of SiO$_2$ thereover having a thickness selected to yield minimum reflection. A silicon layer of that thickness is substantially opaque to visible light and reflectance percentage is shown in the paper only for light far above the visible wavelength range. For a layer of silicon of that thickness, a SiO$_2$ layer of about 2800 Angstroms is employed by Stone et al. It is further stated that the minimum reflectance value is not very sensitive to the thickness to the silicon layer over a thickness range between 75 and 200 Angstroms. Even at the low end of this thickness range, however, the layer of silicon would be substantially opaque to the visible light component of ordinary sunlight.

Similar teaching is presented in Pawlewicz et al., *1315 nm Dielectric Mirror Fabrication By Reactive Sput-*

*tering* presented at the Topical Meeting on High Power Laser Optical Components held at Boulder, Colo. on Oct. 18-19, 1984. Low levels of light absorption are reported in that paper for five reactively sputtered amorphous optical coating materials, including a Si:H/SiO$_2$ film pair. The low absorption was measured for light in the 1.3 µm range and it is taught in the conclusion of the paper that the Si:H material is not useable at visible wavelengths. The same point is made in Pawlewicz et al., *Optical Thin Films-Recent Developments In Reactively Sputtered Optical Thin Films*, Proceedings of the SPIE, Vol. 325, pp. 105-112 (Jan. 26-27, 1982). Table 1 of that paper lists light wavelengths of 1,000 to 9,000 nm (1.0 to 9.0 µm) as the range for which optical coatings of silicon are useful. Thin film coatings of $Si_{1-x}H_x$ for reducing light absorption of infrared laser wavelengths 1.06, 1.315 and 2.7 µm are discussed in Pawlewicz et al., *Improved Si-Based Coating Materials for High Power Infrared Lasers* (November, 1981).

The optical properties of Si:H are discussed also in Martin et al, *Optical Coatings for Energy Efficiency and Solar Applications*, Proceeding of the SPIE, Vol. 324, pp. 184-190 (Jan. 28-29, 1982). The effect is discussed of hydrogen content and Si:H bonding on various optical properties at 2 µm, a non-visible wavelength. Multilayer Si:H/SiO$_2$ laser mirrors with reflectance greater than 99% at non-visible wavelengths 1.315, 2.7 and 3.8 µm also are described. The article notes that Si:H/SiO$_2$ multilayer coatings are easily fabricated by sputtering, since only a single Si target is required, with either H$_2$ or O$_2$ being introduced into the sputtering chamber to form Si:H and SiO$_2$ layers, respectively. The high absorption coefficient in the visible region is said to make thin films of Si:H suitable for use in solar cells to absorb solar radiation.

Various glazing product needs would be met by a new anti-reflective coating system which is substantially transparent to visible light and which can be deposited onto a substrate surface by economical and industrially feasible techniques. In addition, certain glazing applications, such as the above mentioned inside surface of a motor vehicle windshield, require relatively hard and durable anti-reflective coating systems. It is an object of the present invention to provide an anti-reflective coating system, or a glazing unit having an anti-reflective coating thereon, which meets one or more of these product needs. Additional features and aspects of the invention will be understood from the following disclosure and description thereof.

SUMMARY OF THE INVENTION

According to a first aspect of the invention, an article has an anti-reflective coating or layer comprising a film stack, a series of zones on a surface of the article. The anti-reflective coatings of the invention are substantially transparent to visible light in glazing unit applications and certain other preferred embodiments of the invention. A high index of refraction material, specifically, an ultra-thin film of $Si_{1-x}Q_x$ is used in a first zone of the anti-reflective layer over a surface of the article, wherein Q is selected from the group consisting of H, for which x has a value within the range of zero to 0.5, and N, for which x has a value within the range of zero to 0.58. Thus, the first zone of the anti-reflective layer of the invention is silicon or an alloy of silicon with nitrogen, hydrogen or both. In order to be substantially transparent to visible light for use in certain preferred embodiments of the invention, the first zone must be extremely thin. As discussed further below, it is surprising that a zone of $Si_{1-x}Q_x$ sufficiently thin to be substantially transparent to visible light can nevertheless function effectively as the zone of high refractive index material for the anti-reflective layer.

A second zone of the anti-reflective layer over the first zone comprises $Si_{1-x}Q_xO_y$ wherein Q and x are as described above, although Q and the value of x may be independently selected for the different zones of the anti-reflective layer. In fact, as those skilled in the art will appreciate from the discussion which follows, the value of x may vary both from zone to zone and within any zone. The second zone is a gradient zone wherein the value of y increases with distance from the underlying substrate from zero to about 2. Thus, the second zone has a gradient refractive index. The value of y (and the refractive index) may increase substantially continuously or in a series of two or more, preferably many, steps or sub-zones. A third zone of the anti-reflective layer over the second zone comprises SiO$_2$. It will be within the ability of those skilled in the art, in view of the present disclosure and discussion of the invention, including the exemplary and preferred embodiments specifically set forth below, to select suitable relative and absolute thicknesses of the several zones of the anti-reflective layer for particular applications.

It is surprising that the anti-reflective coating of the invention can be substantially transparent and yet have a good anti-reflective efficacy, since it is well known that silicon and $Si_{1-x}H_x$ exhibit strong absorption in the visible wavelength region. $Si_{1-x}N_x$ is more transparent. For that reason $Si_{1-x}Q_x$ has not previously been considered suitable for use in anti-reflective coatings on glazing units or other applications requiring transparency. Because of its high absorption of visible light, it has not been thought possible to use $Si_{1-x}Q_x$ alone or with silicon dioxide or other material for an anti-reflective coating which is substantially transparent to visible light. Nevertheless, the present invention employs $Si_{1-x}Q_x$ effectively in substantially transparent anti-reflective coatings. Specifically, an ultra-thin film of $Si_{1-x}Q_x$ is surprisingly found to be able to function effectively as the high refractive index material in an anti-reflective layer with appropriately matched zone thicknesses of $Si_{1-x}Q_xO_y$ and SiO$_2$.

According to another aspect of the present invention, a glazing unit is provided having on one or more surfaces an anti-reflective coating as described above. The SiO$_2$ exterior zone is found to act as a hard protective layer, providing good durability. Thus, for example, anti-reflective layers of the invention are found to function advantageously in a motor vehicle environment as an anti-reflective layer on a motor vehicle windshield. The anti-reflective layer functions on the inside surface to reduce reflection of light from the dashboard. On the outside surface it increases transmittance of visible light to the interior.

According to another aspect of the invention, a method is provided for making articles, for example motor vehicle windshields and other glazing units, having an anti-reflective layer as described above on one or more surfaces. Advantageously, all three zones can be deposited by sputtering or other methods which are commercially known and economically and industrially feasible. The coating is especially suitable for use on silicon based glass, such as soda-lime glass, in which applications especially durable interfacial adhesion is obtained. Additional features and advantages of the invention will be understood by those skilled in the art in view of the foregoing disclosure and the following detailed description of certain preferred embodiments.

BRIEF DESCRIPTION OF THE DRAWINGS

The following detailed description of certain preferred embodiments of the invention will include discussion of the appended drawings in which.

Figure 1:
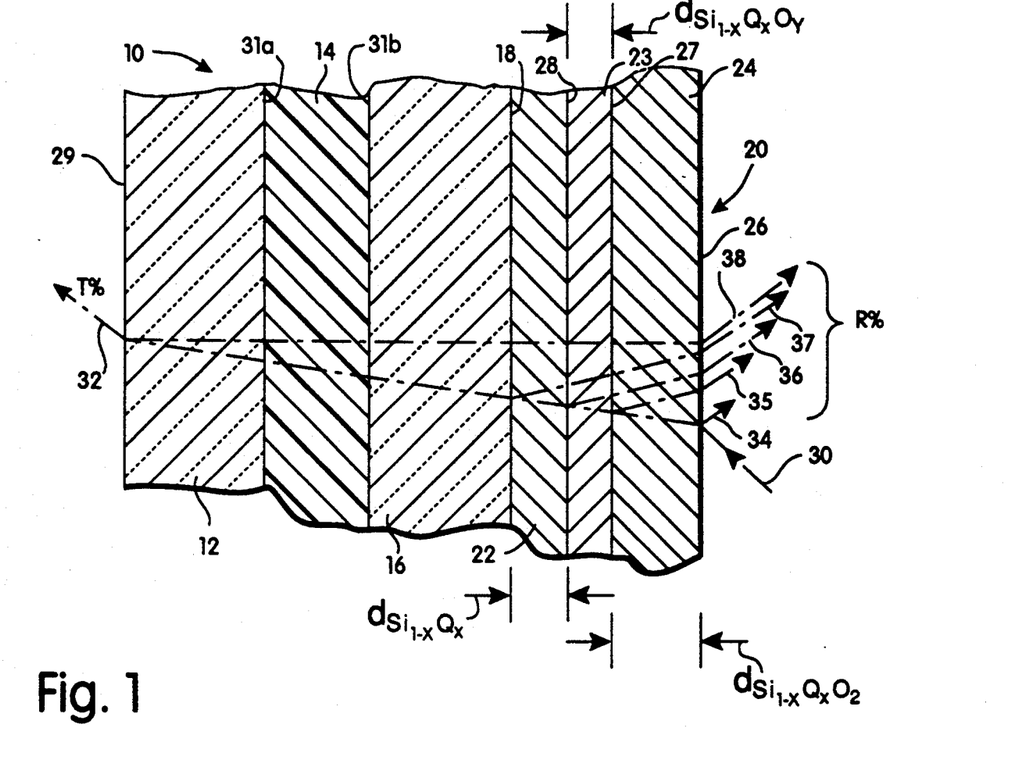
FIG. 1 is a cross-sectional view of a laminated motor vehicle windshield comprising an anti-reflective coating in accordance with certain preferred embodiments of the present invention.

It should be understood that features and elements of the embodiments of the invention illustrated in FIG. 1 are not necessarily precisely to scale. The thicknesses of the films of the anti-reflective coating are shown larger than true scale, for example, for ease of illustration and understanding.

DETAILED DESCRIPTION OF PREFERRED EMBODIMENTS

In the light of the present disclosure numerous applications of the present invention will be apparent to those skilled in the art. For purposes of exemplification, the invention is described with reference to certain preferred embodiments comprising a motor vehicle windshield or other glazing unit having an anti-reflective coating in accordance with the invention on its inside surface (i.e., the surface exposed to the passenger compartment of the motor vehicle). The anti-reflective coatings of the invention, and glazing units having the same, provide several significant advantages. The glass currently used in motor vehicle windshields is typically a silicon based composition. The silicon based anti-reflective coatings of the invention are found to have good interfacial adhesion with a silicon based glass substrate. In addition, the silicon dioxide film forming the exposed surface of the glazing unit provides a hard and durable surface well adapted to the environment experienced by a glazing unit used for a motor vehicle windshield or like application.

It should be understood that reference to the anti-reflective coating of certain embodiments of the invention and to glazing units comprising the same as being substantially transparent to visible light will generally, unless otherwise stated, mean a transmittance value of at least about 50%, and preferably at least about 70%, to meet current guidelines for motor vehicle windshields and also product specifications for certain architectural applications. The term visible light is used broadly to mean light within the wavelength range perceptible by a human observer. It is generally accepted that visible light is in the wavelength range of about 400 to 750 nm.

In the visible wavelength range, percent transmittance plus percent absorption plus percent reflection equals 100%. For glazing units in which the substrate is untinted glass or the like, the absorption of visible wavelength light is negligible, such that the percent transmittance plus the percent reflectance can be taken as equaling almost 100% for the purposes of this discussion.

In certain other preferred embodiments of the invention, the anti-reflective coating can advantageously exclude a much greater percentage of light to provide, in addition to anti-reflectance, privacy and/or increased solar load control. Such embodiments typically will have only about 10% transmission of visible light normally incident on the coated surface. Solar load control refers to exclusion of solar energy from a glazed area to reduce the amount (and, hence, cost) of air conditioning required for the glazed area. A particularly significant application of this type is privacy glazing for all or a portion of a roof area of a motor vehicle.

It should be understood that in the gradient zone of $Si_{1-x}Q_xO_y$ the value of y is an average value corresponding to the relative proportions of various different species in the silicon complex at a given depth in the gradient zone. For example, where x equals zero the value of y at a given depth corresponds to the relative proportions of silicon and stoichiometric silicon dioxide at that depth in the gradient zone. While not wishing to be bound by theory, it presently is understood that the gradient zone comprises an oxygenated silicon complex (that term being used here to include also embodiments comprising the corresponding oxygenated silicon alloy having an amount x of N and/or H) wherein the species $Si_{1-x}Q_x$, $Si_{1-x}Q_xO$ and $Si_{1-x}Q_xO_2$ may not exist as such. The value of y may increase continuously either at a constant rate or at a changing rate. Alternatively, it may increase in multiple increments sufficiently small to approximate or simulate a continuous gradient in terms of the resultant optical properties of the anti-reflective coating. The value of x may be substantially constant throughout the gradient zone or may vary. In addition, the value of x in one zone of the anti-reflective coating may be the same as or different from that in another zone. Since Q is independently selected for each zone, it may be different in different zones. Thus, for example, an anti-reflective coating of the invention may comprise a zone of $Si_{0.6}H_{0.4}$ immediately adjacent the coated surface, $Si_{0.7}N_{0.3}O_y$ in the gradient zone, and $SiO_2$ over the gradient zone.

Referring now to FIG. 1, a cross sectional view of a motor vehicle windshield 10 is seen to comprise an exterior ply 12, preferably soda-lime glass, laminated by a ply 14 of flexible polymeric laminating material, preferably polyvinylbutyral (PVB), to a substrate ply 16, preferably a second ply of soda-lime glass. An anti-reflective coating 20 in accordance with the invention is carried on exposed surface 18 of substrate ply 16. Surface 18 is "exposed" in the sense that it does not form a laminated interface with another ply. Coating 20 is exposed to the atmosphere within the passenger compartment of the motor vehicle. Exterior ply 12 and substrate ply 16 each can be made of plastic or, more preferably, glass. In any event, substrate ply 16 preferably is substantially rigid and inextensible, such that the thin films making up anti-reflective coating 20 are not disrupted by stretching of substrate ply 16 during the lamination process or during the installation or use of the glazing unit.

Anti-reflective coating 20 in the preferred embodiment of FIG. 1 consists of zone 22 of $Si_{1-x}Q_x$, preferably silicon or hydrogenated silicon, $Si_{1-x}H_x$, carried directly on surface 18 of substrate ply 16. Where x is not zero, the value of x preferably remains substantially constant throughout the zone. According to another highly preferred embodiment, zone 22 is silicon at surface 14 and is increasingly nitrogenated, being silicon nitride, $Si_3N_4$ at the interface with gradient zone 23. Silicon nitride has a lower refractive index than silicon and, accordingly, a thicker zone 22 is preferred correspondingly to its $Si_3N_4$ content. Gradient zone 23 of $Si_{1-x}Q_xO_y$ is directly on zone 22. Preferably, gradient zone 23 consists essentially of $SiO_y$ or $Si_{1-x}N_xO_y$. The value of y increases, preferably continuously and at a constant rate, from zero at the interface with zone 22 to 2.0 at the interface with zone 24. The value of x preferably is zero or decreases to zero at the interface with zone 24. The use of $Si_{1-x}N_xO_y$, is particularly advantageous in the gradient zone to control the refractive index profile. $Si_{1-x}N_xO_y$ is more transparent to visible light than $SiO_y$ and, thus, is well suited for use in an anti-reflective layer of the invention on a motor vehicle windshield, which generally must meet certain transparency requirements. According to the highly preferred embodiment mentioned above, where zone 22 starts as silicon at surface 14 and is increasingly nitrogenated to silicon nitride at the interface with zone 23, zone 23 in that embodiment most preferably is increasingly oxygenated and correspondingly less nitrogenated toward the interface with zone 24, by which point it has become substantially silicon dioxide. Zone 24 of silicon dioxide is carried directly on zone 23. Although not necessary in all applications, an anti-reflective coating on a windshield typically will be coextensive with the inside surface thereof.

The refractive index of $Si_{1-x}Q_x$ varies with the value of x. At a value of 0.11 the index of refraction of a sputtered $Si_{1-x}H_x$ film, at 2 μm wavelength, is about 3.45. The above-mentioned Martin et al paper, *Optical Coatings for Energy Efficiency and Solar Applications*, presents a plot (FIG. 5 of that paper) of the refractive index of a sputtered $Si_{1-x}H_x$ film as a function of the value of x at 2 μm wavelength, the same being hereby incorporated by reference. As discussed above, the usefulness of $Si_{1-x}Q_x$ as a high refractive index material in an anti-reflective layer intended for use as a transparent anti-reflective coating is highly surprising in view of its strong absorption of visible light. The present invention overcomes this difficulty, in part, through the use of an ultra-thin film of $Si_{1-x}Q_x$. Surprisingly, anti-reflective efficacy is obtained notwithstanding that the high refractive index material is so thin. Specifically, it has been found that anti-reflective efficacy is achieved with an ultra-thin $Si_{1-x}Q_x$ film coupled with the gradient zone of $Si_{1-x}Q_xO_y$ followed by a zone of $Si_{1-x}Q_xO_2$ of appropriate thickness. Silicon dioxide has a refractive index of about 1.46. For use in motor vehicle windshield applications, the $Si_{1-x}Q_x$ zone preferably is about 10 to 80 Angstroms thick. More preferably where x is zero, zone 22 is between about 10 and 40 Angstroms; where Q is H and x is 0.11, zone 22 is about 10 to 60 Angstroms; and where Q is N and the $Si_{1-x}Q_x$ zone changes from silicon at the substrate surface to fully nitrogenated silicon nitride at the interface with the next zone, zone 22 is about 10 to 80 Angstroms. Where Q is N, x preferably is from zero to 0.58. A value of 0.58 corresponds to substantially stoichiometric silicon nitride. The gradient zone preferably is about 30 to 1600 Angstroms thick. The $SiO_2$ film preferably is about 300 to 2000 Angstroms, more preferably about 300 to 1500, most preferably about 1400 Angstroms. These preferences are based on the optical properties of the resulting anti-reflective coating, including especially the percent reflectance and percent transmittance of a resulting laminated windshield.

As discussed further below, a highly preferred embodiment of the invention consists of a laminated motor vehicle windshield having an anti-reflective coating directly over an exterior surface of a 0.09 inch thick ply of clear soda-lime glass. The opposite surface of the soda-lime glass ply is laminated to a second such ply by a 0.03 inch ply of clear PVB. The anti-reflective layer consists of a first zone of Si about 10 to 30 Angstroms thick, more preferably about 20 Angstroms thick directly on the glass followed by a gradient zone of $SiO_y$ about 100 to 1220 Angstroms. Within the gradient zone the value of y increases rapidly from zero at the interface between the first and second zones to a value of about 1.8. Specifically, this increase occurs over about 60 Angstroms. The increase in the value of y from 1.8 to 2.0 occurs over the remaining thickness of the second zone. The $SiO_2$ zone is about 300 to 1700 Angstroms thick, more preferably about 300 to 1500 Angstroms. The coated windshield is highly transmissive for visible light. The anti-reflective layer eliminates virtually all reflection of visible light (380 to 620 nm wavelengths) from the coated surface of the windshield. An uncoated surface of such a glass ply has 4% reflectance of visible light. If the outside surface of the windshield does not have an anti-reflective layer, its reflectance of visible light would be about 4%. Total reflectance of 4% would be one-half the 8% reflectance of a windshield with both exterior surfaces having no anti-reflective layer.

It should be understood in the light of the present disclosure and discussions of the invention, that the transition from one zone to another within the anti-reflective layer, and the transition from the substrate to the first zone of $Si_{1-x}Q_x$, will in many embodiments be somewhat gradual. The interface between two zones of the anti-reflective layer and the interface between the anti-reflective layer and the substrate should be taken as being located at the best reasonably identified transition point, that is, at the level or depth which, as a practical matter, best complies with the general principle of the invention set forth herein.

The $Si_{1-x}Q_x$, $Si_{1-x}Q_xO_y$ and $SiO_2$ zones of the anti-reflective coatings of the invention can be made employing equipment and techniques which are commercially available and well known to those skilled in the art. Thus, the films can be deposited onto a glass or other substrate surface by reactive sputtering. For deposition of Si, a silicon target can be sputtered in an inert atmosphere. Hydrogen gas, $H_2$, can be included in the sputtering atmosphere to deposit hydrogenated silicon, $Si_{1-x}H_x$ and $Si_{1-x}H_xO_y$. Oxygen gas, $O_2$, can be included for deposition of $Si_{1-x}Q_xO_y$ and $SiO_2$. Nitrogen gas can be included for deposition of and $Si_{1-x}N_x$ and $Si_{1-x}N_xO_y$. Alternative sources of H, N and O will be apparent to the skilled of the art in view of the present disclosure. In this regard, the amount of oxygen gas introduced into the sputtering atmosphere must be carefully limited and increased only gradually. The high affinity of silicon for oxygen leads to the deposition of $SiO_2$ when the oxygen gas is used in small relative proportions, such as for example 15% oxygen gas for sputter deposition of $SiO_2$. Prior known processes in which oxygen was introduced rapidly in large relative proportions during sputter deposition of silicon would produce a substantially abrupt change from Si to $SiO_2$ deposition. The sputtering atmosphere for deposition of the gradient zone in a typical process of the invention would compromise less than 5% oxygen gas, increasing to about 60% at the interface of the gradient zone with the $SiO_2$ zone. Deposition rate also affects composition of the film. A slower deposition rate generally produces a higher oxygen content in the film.

The zones of $Si_{1-x}Q_xO_y$ can also be deposited by chemical vapor deposition techniques, preferably using silane or higher order silanes as a donor gas and helium as a carrier gas. It is contemplated that increases in the thickness of the films may be achievable while still meeting a given transparency requirement by appropriately adjusting the deposition parameters or technique or by using alternative deposition methods. In general, it is an advantage of the invention that the $Si_{1-x}Q_xO_y$ can be deposited quickly and, hence, economically, in part because the zones are relatively thin. Typically, the zones are deposited in turn onto a surface of a ply, for example, a glass sheet.

In one alternative method, a zone of silicon is formed by ion bombardment of the substrate, such as soda-lime glass, followed by deposition of the gradient zone and the $SiO_2$ zone.

In another alternative method, a film of silicon, preferably about 50 to 150 Angstroms, is deposited on a glass surface and then heated, for example while bending the glass in air at the glass bending temperature, prior to depositing the above described zones of the anti-reflective coating. The silicon film is sufficiently thin that the glass clears during the heating and bending. While not intending to be bound by theory, it is believed that the silicon is at least partially oxidized. In any event, the heating improves adhesion of the antireflective coating to the glass substrate. It also improves the mechanical, and likely the chemical, durability of the film stack. It appears that this method provides a diffuse interface between the anti-reflective coating and the glass substrate. According to a preferred embodiment of this coating method, a silicon film is deposited, on the surface of a glass ply and the glass then is heated to an elevated temperature, typically at least about 1000° F., for example 1040° F., and preferably to the bending temperature of the glass, typically about 1250° F. After heating at such elevated temperature for a time sufficient to alter the optical properties of the silicon, preferably at least about fifteen minutes at 1250° F., the glass is slowly cooled to room temperature. After such process, a zone of $Si_{1-x}Q_x$ is deposited, followed by the gradient zone and the $SiO_2$ zone of the anti-reflective layer.

In a preferred method of the invention a substantially transparent laminated glazing unit is fabricated by sputtering a 10 to 100 Angstroms, more preferably about 20 to 80 Angstroms, thick $Si_{1-x}H_x$ zone onto a major surface of a substantially inextensible substrate ply. A 10 to 500 Angstrom, more preferably 30 to 300 Angstrom, thick gradient zone of $SiO_y$ is sputtered over the first zone. A 300 to 1500 Angstrom, more preferably about 1200 to 1500 Angstrom, thick silicon dioxide film is sputtered over the gradient zone. The substrate ply then is laminated to another ply of glass, plastic, etc. by means of a laminating ply of PVB or other flexible polymeric material. Specifically, the laminating ply is sandwiched between the substrate ply and the additional ply and they are laminated, usually by application of heat and pressure and perhaps vacuum. The surface of the substrate ply carrying the anti-reflective coating is positioned as an exterior surface of the glazing unit closest to the viewer.

The path of incident light through a glazing unit having an anti-reflective coating in accordance with the invention is illustrated in FIG. Specifically, incident light 30 strikes the surface 26 of the anti-reflective film 20 and a substantial portion thereof passes through the anti-reflective coating and the remainder of the glazing unit to exit through surface 13 of exterior ply 12 as transmitted light 32. Typically, a portion of incident light is reflected back at each interface between materials of different refractive indexes. Virtually no light is reflected back at either of the two glass/PVB interfaces 31a and 31b, because the refractive index of glass is so close to that of PVB. Normally, approximately 4% of incident light is reflected back at a glass/air interface. Thus, as noted above and as marked in FIG. 2, bare glass has a total reflectance R of about 8%, that is, 4% from each surface of the glass. In certain most preferred embodiments of the present invention, total reflectance is reduced to as low as about 4% using an anti-reflective coating on one surface. Specifically, the reflectance from the surface carrying the anti-reflective coating of the invention is reduced nearly to 0%, leaving only the 4% from the air/glass interface at the opposite glass surface. In another preferred embodiment an anti-reflective coating is employed on both surfaces and reflectance is reduced nearly to zero for the glazing unit.

This can be better understood with reference again to FIG. 1. Incident light 30 strikes surface 26 of anti-reflective coating 20. Total reflectance R, expressed as a percentage of incident light 30, includes: (i) light 34 reflected at the air/$SiO_2$ interface at surface 26; (ii) light 35 reflected at the $SiO_2$/$Si_{1-x}Q_xO_y$ interface 27; (iii) light 36 reflected at the $Si_{1-x}Q_xO_y$/$Si_{1-x}Q_x$ interface 28; (iv) light 37 reflected at the $Si_{1-x}Q_x$/glass interface at surface 18 and (v) light 38 reflected from the glass/air interface at surface 29. It should be recognized that the combined reflections 34 plus 35 plus 36 plus 37 will be zero, or virtually zero. In fact, in the most preferred embodiments the gradient index of the adjacent zones at interfaces 27 and 28 are so closely matched that there is virtually no reflection at these interfaces. In such embodiments, while not wishing to be bound by theory, it presently is understood that reflections 34 and 37 substantially cancel one another. As noted above, the two glass/PVB interfaces 31a and 31b can be ignored, since the refractive index of the two materials is almost identical. The percentage of light passing through surface 29 is the transmittance percentage T%. Actually, those skilled in the art will recognize that T also includes a certain amount of light reflected back at surface 29 but re-reflected at an interface encountered in its return path. Reflectance from glass surface 18 without the anti-reflective coating of the invention would be about 4%, as noted above. According to certain most preferred embodiments of the invention, such reflectance with anti-reflective coating 20 thereon, i.e., the sum of 34 through 37, equals approximately zero. Thus, the reflectance for the glazing unit is primarily that being contributed by reflectance 38. While substantial reflectance of visible light incident on the coated surface would have been expected at the $Si_{1-x}Q_x$/glass interface, because of the large difference in the refractive index of those materials, reflectance 37 is, in fact, essentially zero.

While not intending to be bound by theory, it presently is understood that reflectance 37 is essentially zero because the ultra-thin $Si_{1-x}Q_x$ film is too thin to establish an optically significant interface with the glass. As noted above, of course, it has been found nevertheless sufficient to act as the high refractive index material in the anti-reflective coating of the invention. It will be understood from the foregoing that an embodiment of the invention further comprising an anti-reflective coating on surface 29 of exterior glass ply 29 would have total reflectance of approximately zero.

Certain alternative preferred embodiments are glazing units which employ anti-reflective layers of the invention to also provide privacy and/or high solar load control. Architectural glazing applications and roof area glazing for a motor vehicle are particularly advantageous applications of this type. Transmittance of both visible and non-visible light is greatly reduced, while reflectance of visible light remains low, at least from the coated surface. Greater zone thickness in the first zone, that is, the $Si_{1-x}Q_x$ zone, is employed to reduce transmittance. Preferably the $Si_{1-x}Q_x$ zone is about 10 to 80 Angstroms, more preferably about 20 to 50 Angstroms for x equal to 0. The thickness of the gradient zone will depend, of course, as in the case of substantially transparent embodiments of the invention, on the refractive index profile within the zone and its other optical properties. The optical properties depend, in turn, on the values of x and y throughout the zone and the identity of Q (if any). As in the case of the substantially transparent anti-reflective layers, Q preferably is N or x is zero, at least at the interface with the $SiO_2$ zone, in view of the better adhesion and film formation of the oxide species when the silicon is not hydrogenated. Preferably the gradient zone is about 10 to 3500 Angstroms thick, more preferably about 20 to 3000 Angstroms (the greater thickness end of the range being generally for more highly nitrogenated zone material), with y increasing continuously at a steady rate.

The $SiO_2$ zone thickness range depends to some extent on that of the first zone and of the gradient zone. It will be within the ability of those skilled in the art, in view of the present disclosure, to select suitable zone thicknesses for all zones of the anti-reflective layer in privacy glazing applications, just as it is for the substantially transparent anti-reflective layer embodiments. Generally, for the preferred zone thicknesses disclosed above for the first zone and the gradient zone, the $SiO_2$ zone preferably is about 100 to 5000 Angstroms, more preferably about 300 to 3000 Angstroms thick.

It should also be understood that additional layers or zones may be employed with the three zones of the anti-reflective layer described herein. In one particularly preferred embodiment of the invention adapted for a privacy glazing application, a reverse gradient zone of $Si_{1-x}Q_xO_z$ is located between the substrate surface and the first zone of $Si_{1-x}Q_x$, where Q and the value of x is selected independently for the different zones and the value of z decreases with distance from the substrate to zero at the interface between the reverse gradient zone and the $Si_{1-x}Q_x$ zone. The value of x in the reverse gradient zone preferably is zero and the value of z preferably decreases from a high value between about 1.5 and 2.0 closest the substrate, more preferably between about 1.8 and 2.0, to zero at the interface with the $Si_{1-x}Q_x$ zone. This embodiment is found to provide exceptionally low reflectance of visible light incident on the coated surface of a laminated soda-lime glazing unit and, as well, of visible light incident on the opposite, uncoated surface.

Figure 2:
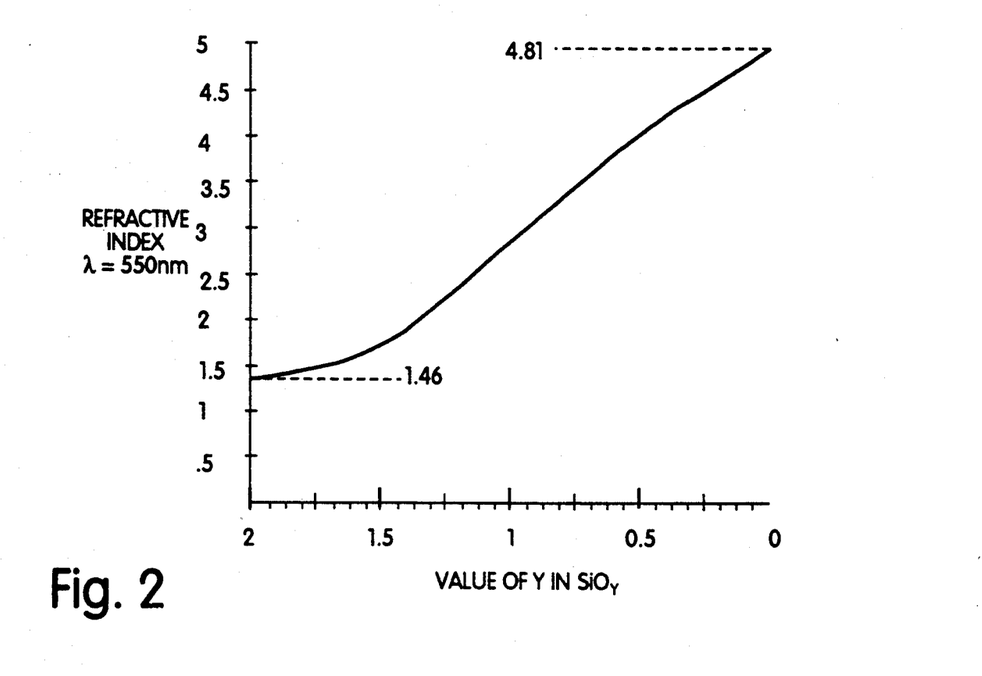
FIG. 2 is a graph showing the refractive index of a gradient zone of $SiO_y$ (x being zero) in the glazing unit of FIG. 1 (measured for visible light, specifically, 550 nm wavelength light) as a function of the value of y.

The optical properties, specifically refractive index, transmittance and reflectance, of anti-reflective coatings of the invention are shown in the graphs of FIGS. 2 through 7. In FIG. 2, the refractive index of $SiO_y$ is shown as a function of the value of y (from zero to 2.0), measured at 55 nm wavelength. For the remaining Figures, spectrophotometric reflectance (R) and transmittance (T) values, as percentages, were calculated using a computer program adapted to give integrated R and T values for UV, visible, and IR regions for a given angle of incidence on an anti-reflective layer of the invention on a clear soda-lime glass substrate. Such computer programs are commercially available. Literature values of the optical constants, the refractive index and extinction coefficient of the coating materials were used in calculating the R and T values. The computer program was provided T and R values for given zone thicknesses, that is, $d_{Si}$, $d_{SiO_y}$ and $d_{SiO_2}$ parametric values. Plots were drawn for R and T as a function of thickness for parametric thicknesses of $SiO_2$ films. These curves were used to decide the thicknesses of experimentally deposited zones, providing minimum reflection with maximum transmission. Spectrophotometer reflectance and transmittance plots of actual samples were obtained using a Perkin-Elmer Lambda-9 spectrophotometer. The experimental results agreed very well with values predicted by the computer program. The results shown in FIGS. 4 through 7 were then determined by the computer program for coatings according to the present invention, employing hydrogenated silicon. The values were calculated for normal incidence. A similar procedure was applied to oblique incidence, including 65° which is the installation angle of a typical motor vehicle windshield (as viewed by a driver of the vehicle).

Figure 3:
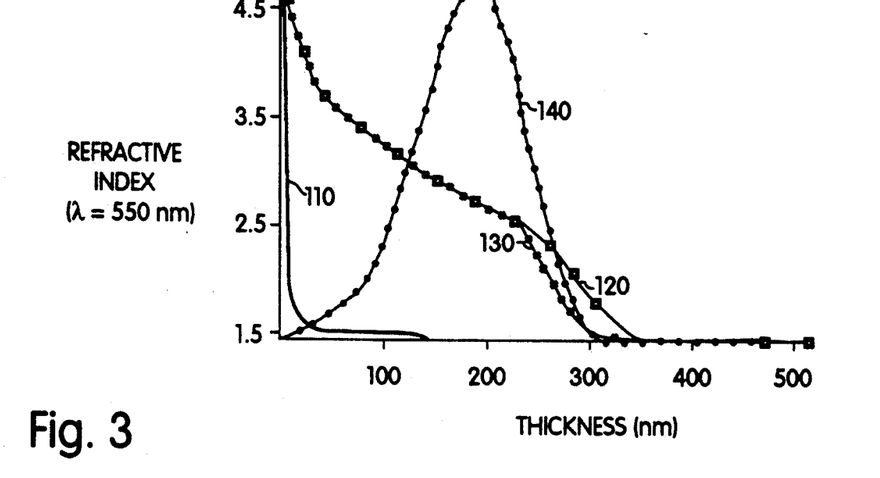
FIG. 3 is a graph showing refractive index as a function of coating depth in four different anti-reflective coatings of the invention on otherwise identical laminated windshields, the four coatings being those described in Examples 1 through 4, below.

The following examples provide details of the invention according to four glazing unit embodiments, the first having a substantially transparent anti-reflective layer and the remaining three having anti-reflective layers which also provide privacy and solar load control. In FIG. 3 the refractive index is shown as a function of film height (zero height being at the substrate surface) for the anti-reflective coatings of the examples. Specifically, plot line 110 is the refractive index profile for Example 1. Plot lines 120, 130 and 140 are the refractive index profiles for the anti-reflective coatings of Examples 2, 3 and 4, respectively. In each case, there is a gradient refractive index corresponding to the gradient in the degree of oxygenation in the gradient zone of the anti-reflective coating. Plot line 110, for example, shows a rapid decrease in refractive index, corresponding to rapid increase in the value of y in the $Si_{1-x}Q_xO_y$ zone of the anti-reflective coating. Plot line 140 shows a gradient increase in the refractive index followed by a gradient decrease corresponding to a reverse gradient zone $Si_{1-x}Q_xO_z$ in which z decreases with distance from the substrate, followed by a zone of silicon and then a gradient zone of $Si_{1-x}Q_xO_y$ wherein y increases with distance from the substrate.

EXAMPLE 1

A substantially transparent anti-reflective layer (128 nm total thickness) on the inside exposed surface of a laminated window is deposited by reactive sputtering. The windshield has an exterior 0.09 inch thick clear soda-lime glass ply laminated by a 0.03 inch PVB ply to a second 0.09 inch thick clear soda-lime glass ply. The exposed surface of the second glass ply carrier the anti-reflective layer consisting of a 20 Angstrom zone of silicon directly on the glass surface followed by a gradient zone consisting of five sub-zones in the following order: 6 Angstroms of $SiO_{0.2}$ directly on the first zone, 7 Angstroms of $SiO_{0.4}$, 7 Angstroms of $SiO_{0.8}$, 2 Angstroms of $SiO_{1.2}$ and 16 Angstroms of $SiO_{1.6}$. A third zone of $SiO_2$, 1220 Angstroms thick, is directly on the gradient zone and is exposed to the atmosphere. The windshield has the following calculated transmittance and reflectance values for visible luminance measured at 0° angle of incidence: 73.4% transmittance (Illuminant A); 71.0% transmittance (Illuminant C); 6.4% reflectance (Illuminant A) from the exterior surface of the first ply (corresponding to the exterior or No. 1 surface of the windshield); 6.4% reflectance (Illuminant C) from the No. 1 surface; only 3.5% reflectance (Illuminant A) from the coated surface of the second glass ply; and only 3.5% reflectance (Illuminant C) from that surface.

Figure 4:
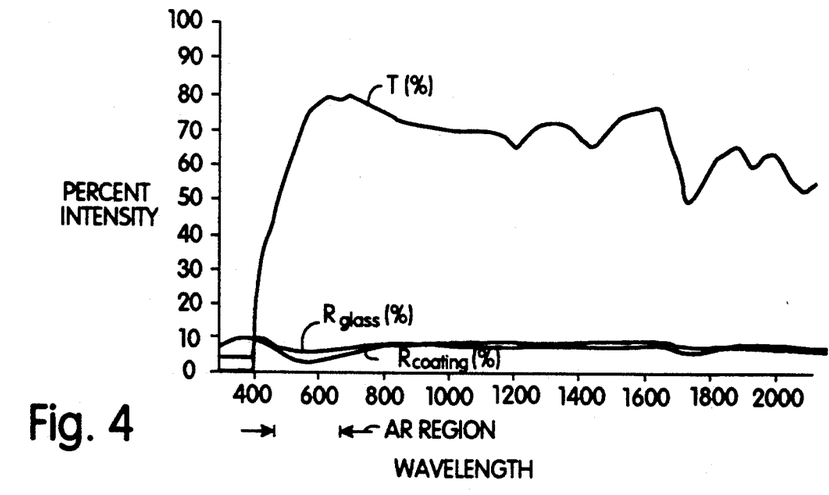
FIGS. 4 through 7 are graphs showing reflectance and transmittance values, expressed as percent intensity, as a function of wavelength for glazing units having anti-reflective coatings in accordance with the invention, as described in Examples 1 through 4, below, respectively.

FIG. 4 shows graphically the transmittance and reflectance of the windshield of Example 1 as a function of wavelength. The line labeled "T" is percent transmittance through the windshield. The line labeled $R_{glass}$ is percent reflectance of incident light from the uncoated exterior (No. 1) surface. The line labeled $R_{coating}$ is percent reflectance of incident light from the coated (No. 4) surface. It can be readily seen that reflectance of visible light from the coated surface is exceptionally low.

EXAMPLE 2

A privacy glass embodiment of the invention is formed as a coating on an outside exposed (No. 1) surface of a laminated glazing unit adapted for roof area glazing in a motor vehicle. The glazing unit has first and second plies of 0.09 inch thick clear soda-lime glass laminated together by a 0.03 inch thick ply of PVB in the usual manner, as in Example 1. The anti-reflective coating on the No. 1 surface has a total thickness of about 312 nm. It consists of a first zone of silicon 6 nm thick deposited by sputtering from a silicon target in an inert sputtering atmosphere. The first zone is directly on the substrate surface and is followed immediately by a gradient zone having four sub-zones: 3 nm $SiO_{0.4}$ directly on the first zone; 93 nm $SiO_{0.8}$, 123 nm $SiO_{1.2}$; and 55 nm $SiO_{1.6}$. The sub-zones are deposited also by sputtering, the sputtering atmosphere being about 11% $O_2$ gas for the first sub-zone, about 16% for the second sub-zone, about 18% oxygen gas for the third sub-zone, and about 19% oxygen gas for the last sub-zone. The $SiO_2$ zone is about 32 nm thick and is deposited by sputtering from a silicon target in an atmosphere at least 20% oxygen. The glazing unit has the following calculated transmittance and reflectance values for visible luminance measured at 0° angle of incidence: 11.7% transmittance (Illuminant A); 9.5% transmittance (Illuminant C); only 4.1% reflectance (Illuminant A) from the coated No. 1 surface and 3.3% reflectance (Illuminant C) from that surface; and 23.2% reflectance (Illuminant A) and 23.7% reflectance (Illuminant C) from the uncoated No. 4 surface.

Figure 5:
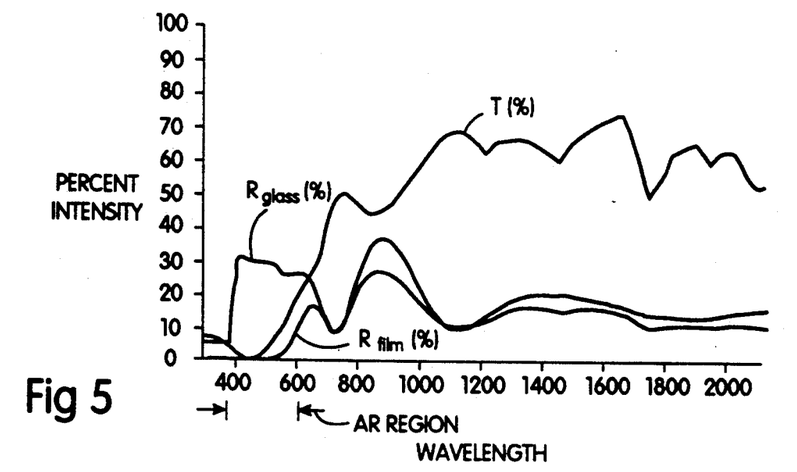

FIG. 5 shows graphically the transmittance and reflectance of the glazing unit of Example 3 as a function of wavelength. The lines labeled "T," "$R_{glass}$" and "$R_{coating}$" have the same meaning as in FIG. 4. It can be readily seen that both transmittance and reflectance from the anti-reflection coated surface, over most of the visible light range, are very low.

EXAMPLE 3

A privacy glass embodiment of the invention is formed as a coating on an outside, exposed (No. 1) surface of a laminated glazing unit adapted for roof area glazing in a motor vehicle. The glazing unit has first and second plies of 0.09 inch thick clear soda-lime glass laminated together by a 0.03 inch thick ply of PVB as in Example 1. The anti-reflective coating on the No. 1 surface has a total thickness of about 520 nm. It consists of a first zone of silicon 6 nm thick deposited by sputtering from a silicon target in an inert sputtering atmosphere directly on the glass surface. The first zone is followed by a gradient zone having four sub-zones each deposited by sputtering from a silicon target in an atmosphere consisting of oxygen as well as inert gas. The proportion of oxygen increases for each succeeding sub-zone. The first sub-zone closest to the Si zone is 66 nm of $SiO_{0.4}$, followed by 89 nm of $SiO_{0.8}$, followed by 36 nm of $SiO_{1.2}$, followed by 40 nm of $SiO_{1.6}$. A third zone of $SiO_2$ 70 nm thick is deposited by sputtering from a silicon target in an atmosphere comprising oxygen gas. It is deposited directly over the fourth sub-zone of the gradient zone.

The glazing unit has the following calculated transmittance and reflectance values for visible luminance measured at 0° angle of incidence: 10.3% transmittance (Illuminant A); 8.1% transmittance (Illuminant C); only 1.2% reflectance (Illuminant A) from the coated No. 1 surface and 1.3% reflectance (Illuminant C) from that surface; and 22.2% reflectance (Illuminant A) and 23.1% reflectance (Illuminant C) from the uncoated No. 4 surface.

Figure 6:
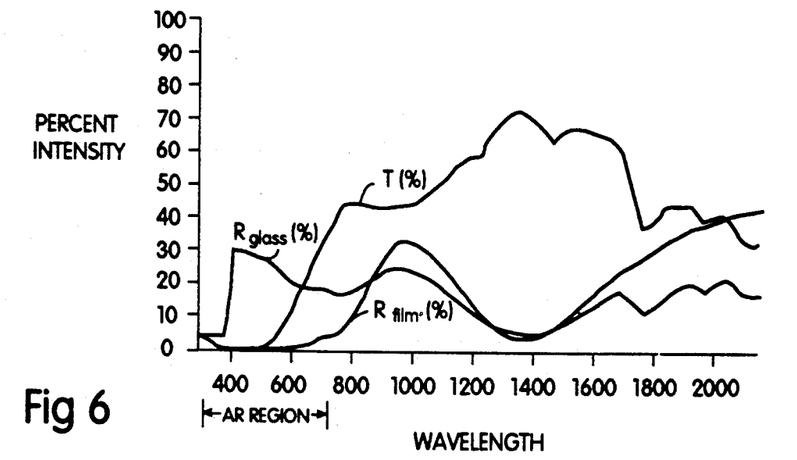

FIG. 6 shows graphically the transmittance and reflectance of the glazing unit of Example 3 as a function of wavelength. The lines labeled "T," "$R_{glass}$" and "$R_{coating}$" have the same meaning as in FIG. 4. It can be readily seen that both transmittance and reflectance from the anti-reflection coated surface, over most of the visible light range, are very low.

EXAMPLE 4

This example describes another privacy glass embodiment of the invention suitable for glazing a motor vehicle roof area or the like. The substrate is a glass/PVB glass laminate as in the prior examples. The anti-reflective layer is on the exterior or No. 1 surface and consists of a reverse gradient zone of $SiO_z$ 1535 Angstroms thick directly on the glass surface followed immediately by a zone of silicon 65 Angstroms thick followed immediately by a gradient zone of $SiO_y$ 1600 Angstroms thick, followed immediately by a zone of $SiO_2$ 995 Angstroms thick. The reverse gradient zone consists of three sub-zones, including a first sub-zone of $SiO_{1.6}$ 690 Angstroms thick directly on the glass surface, followed by 385 Angstroms of $SiO_{1.0}$, followed by a third sub-zone of $SiO_{0.4}$ 460 Angstroms thick. The gradient zone over the silicon zone consists of three sub-zones, the first being 480 Angstroms of $SiO_{0.4}$ immediately over the silicon. The second sub-zone is 475 Angstroms of $SiO_{1.0}$. The last sub-zone is 645 Angstroms of $SiO_{1.6}$. In this and the previous examples, the sub-zones are sufficiently thin, in view of the small incremental changes in the degree of oxygenation from one sub-zone to the next, to approximate a continuously increasing (or decreasing) refractive index in the gradient (or reverse gradient) zone. The last zone is 995 Angstroms of $SiO_2$. Thinner gradient sub-zones are preferred and continuous change in the degree of oxygenation is more preferred in view of the somewhat improved optical properties they provide. The zones of the anti-reflective layer fare deposited by sputtering in accordance with known techniques and the principles discussed above. The glazing unit has the following calculated transmittance and reflectance values for visible luminance measured at 0° angle of incidence: 10.7% transmittance (Illuminant A); 8.1% transmittance (Illuminant C); only 2.8% reflectance (Illuminant A) from the coated No. 1 surface and 2.9% reflectance (Illuminant C) from that surface; and only 4.4% reflectance (Illuminant A) and 4.4% reflectance (Illuminant C) from the uncoated No. 4 surface.

Figure 7:
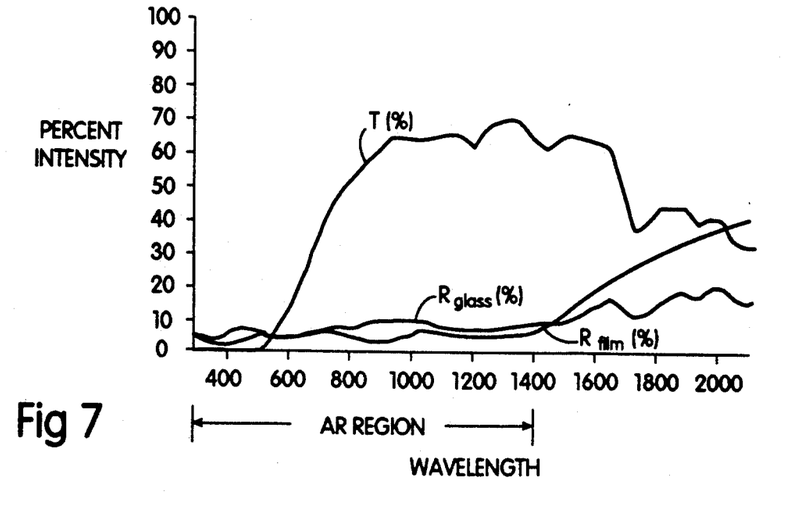

FIG. 7 shows graphically the transmittance and reflectance of the glazing unit of Example 4 as a function of wavelength. The lines labeled "T," "$R_{glass}$" and "$R_{coating}$" have the same meaning as in FIG. 4. It can be readily seen that both transmittance and reflectance from the anti-reflection coated surface, over most of the visible light range, are very low. In addition, the 4.4% reflectance from the uncoated surface, $R_{glass}$, is only minimally above the 4% reflectance normally seen from bare glass. Thus, very little reflectance is occurring at the coated surface back to the uncoated surface. The low reflectance from both coated and uncoated surfaces is a significant advantage of this embodiment of the invention.

While various exemplary and preferred embodiments of the invention have been described above, it will be apparent to those skilled in the art, in the light of this disclosure, that variations and modifications can be made without departing from the true spirit of the invention. All such variations and modifications are intended to be included within the scope of the appended claims.

We claim:

1. An article comprising a substrate having a surface and an anti-reflective layer on the surface of the substrate, the anti-reflective layer comprising a first zone of $Si_{1-x}Q_x$, a gradient zone of $Si_{1-x}Q_xO_y$ over the first zone wherein y has a value increasing with distance from the surface of the substrate from zero to 2, and a third zone of $SiO_2$ over the gradient zone, Q and x being independently selected for the first and gradient zones, Q being selected from H, for which the value of x is from zero to 0.5, and N, for which the value of x is from zero to 0.58, wherein the first zone is 1 to 8 nm thick, the value of y increases substantially continuously in the gradient zone and the gradient zone is 3 to 160 nm thick, and the third zone is 30 to 500 nm thick.

2. The article of claim 1 further comprising a reverse gradient zone of $Si_{1-x}Q_xO_z$ mediate the substrate and the first zone, Q and x being as defined in claim 1 and z having a value which decreases from a first value at an interface with the substrate surface to zero at an interface with the first zone.

3. The article of claim 2 wherein said first value of z is from about 1.8 to 2.0.

4. The article of claim 1 wherein the value of x in the gradient zone decreases with distance from the substrate surface from an initial value to about zero.

5. The article of claim 1 wherein the value of y in the gradient zone increases substantially continuously with distance from the substrate.

6. The article of claim 1 wherein the substrate is substantially transparent.

7. The article of claim 6 wherein the substrate is soda-lime glass.

8. The article of claim 1 wherein Q is H and x has a value between 0.05 and 0.2 in the first zone.

9. The article of claim 1 wherein Q is N and x has a value between zero and 0.58 in the gradient zone.

10. The article of claim 1 wherein the value of x varies with distance from the substrate in at least one of said zones.

11. The article of claim 1 wherein x is zero in said first and gradient the zones of the anti-reflective layer.

12. The article of claim 1 wherein x is zero in the first and third zones, and x is between zero and 0.58 and Q is N in the gradient zone.

* * * * *